April 6, 1926.
G. CAPPI
1,579,645
MACHINE FOR IMMERSING, COOKING, AND DELIVERING FOOD PRODUCTS
Filed May 11, 1925　　2 Sheets-Sheet 1
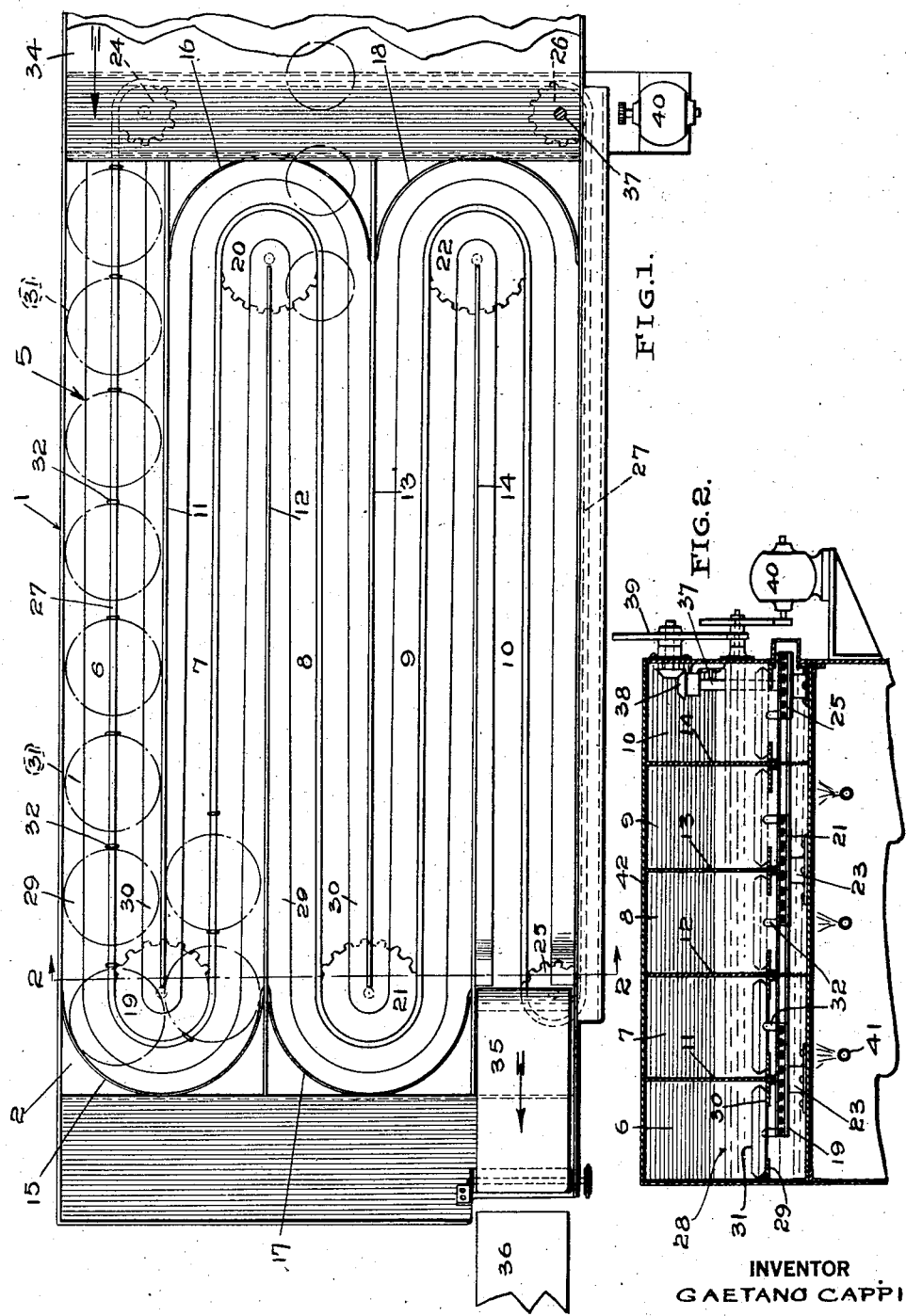
INVENTOR
GAETANO CAPPI
ATTORNEY April 6, 1926. 1,579,645
G. CAPPI
MACHINE FOR IMMERSING, COOKING, AND DELIVERING FOOD PRODUCTS
Filed May 11, 1925 2 Sheets-Sheet 2
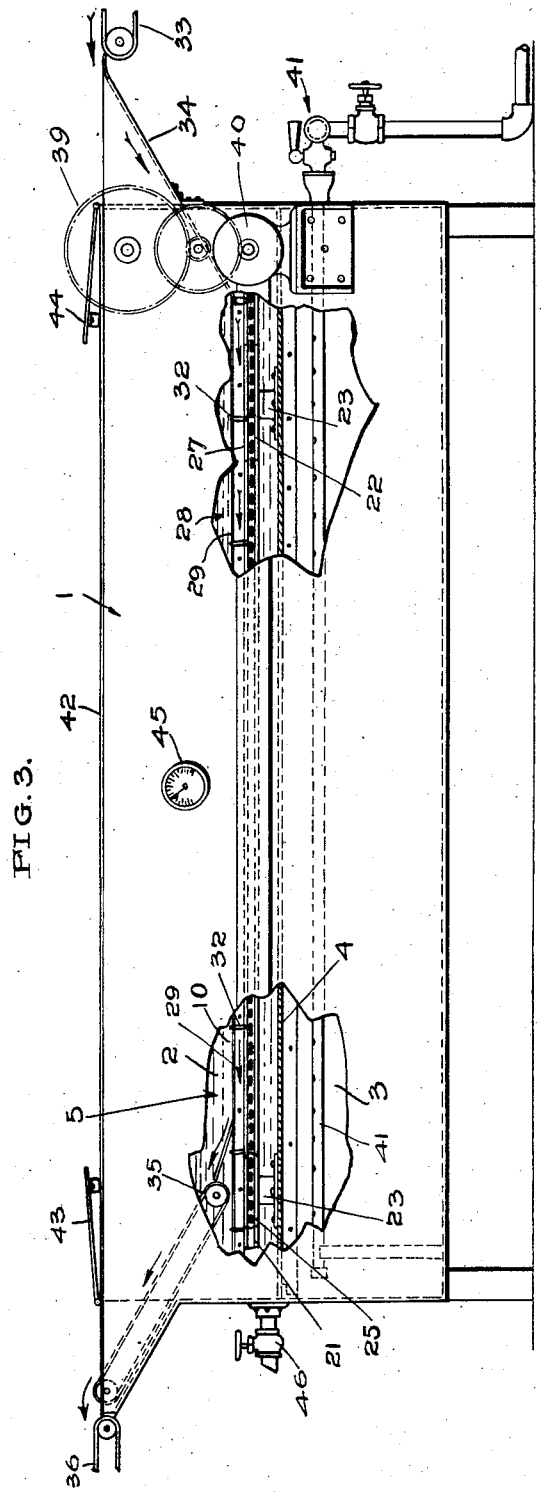
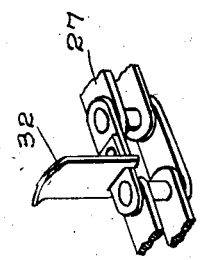
INVENTOR
GAETANO CAPPI.
BY
ATTORNEY.

Patented Apr. 6, 1926.

1,579,645

UNITED STATES PATENT OFFICE.

GAETANO CAPPI, OF SAN FRANCISCO, CALIFORNIA.

MACHINE FOR IMMERSING, COOKING, AND DELIVERING FOOD PRODUCTS.

Application filed May 11, 1925. Serial No. 29,637.

*To all whom it may concern:*

Be it known that I, GAETANO CAPPI, a citizen of the United States, residing at San Francisco, in the county of San Francisco and State of California, have invented certain new and useful Improvements in Machines for Immersing, Cooking, and Delivering Food Products, of which the following is a specification.

The present invention relates to machines specially devised for cooking in quantity food products of the character described in my United States Letters Patent of April 7th, 1925, No. 1,532,881, and is of such construction that the utensils containing the food products to be cooked are fed in at one end to an endless-chain conveyor to be thereby borne through a properly heated tank of oil, or other suitable liquid, emerging therefrom, through the agency of a conveyor, as a perfectly cooked product.

The speed of the conveyor chain contributing to the transit of the utensils bearing the food products is governable to any extent through the medium of a train of reduction gears controlling the motor, or such other actuating means as may be employed for the conveyor chain's movement, and provides effectually for a properly timed immersion, transit and delivery of the food products, the determination in this direction being dependent upon the quantity and quality of the raw food products to be cooked, this speed being regulable in accordance therewith.

Obviously, the machine may be constructed with a view to the employment of a straight line conveyor, but is preferably of the construction illustrated, since, with a succession of side by side and reversed passage-ways, greater compactness is assured and better results under more readily controlled conditions obtained, to which there is the added advantage that raw products differing in the length of time required for their cooking may be introduced at varying points along the conveyor line to meet these differing conditions.

The principal object of the present invention is the provision of a machine adapted for the cooking of food products in quantity while in immersed transit through heated oils, or grease, and automatically governing both their transit and delivery.

A further object is to provide a machine for the purpose specified that is of simple design, cheap construction and readily operated.

Other objects and advantages of the invention will present themselves with reference to the subjoined specification and the accompanying drawings forming a part thereof, and be more clearly set forth in the claim appended hereto.

In the drawings, similar characters of reference refer to like parts, throughout.

Figure 1 is a top plan view of the machine, with its cover removed, showing the endless-chain conveyor, as arranged for traversing the successive passage-ways, the entrance chute, and the delivery conveyor;

Figure 2 is a transverse section of the machine, taken on the line 2—2 of Figure 1, showing the disposition of the sprocket-chain conveyor, the guide-rails for supporting the utensils containing the food products while in transit, and the driving-gears with motor attached for their actuation;

Figure 3 is a side elevation of the machine, with parts broken away for its better illustration, showing the chain conveyor, the entrance chute, the delivery chute, and the heating medium; and Figure 4 is a perspective detail of a portion of the conveyor chain, showing the method of attaching the utensil-engaging brackets.

My invention comprises a rectangular tank 1 constructed of any suitable sheet-metal material and divided by a horizontal partition 4 into upper and lower compartments 2 and 3, the upper section of which 5 is adapted to contain a liquid cooking medium, while the lower contains the heating element.

The section 5 is divided longitudinally and vertically into a plurality of reversely arranged passage-ways 6, 7, 8, 9 and 10 by means of partitions 11, 12, 13 and 14 and the curved end-guards 15, 16, 17 and 18, forming channels in parallelism, with an end of one leading into that of its neighbor, said guards having a plurality of concentrically positioned sprocket-wheels 19, 20, 21 and 22 mounted upon a plurality of stub-shafts anchored to the bottom 4 of the cooking tank, or section, 5 by means of flanged journals, as shown in Figure 2.

A plurality of guide sprocket-wheels 24, 25 and 26, of smaller diameter than the sprocket-wheels 19, 20, 21 and 22, are positioned within this tank in such manner that the endless sprocket-chain 27 may be continuously moved throughout the several passage-ways in a succession of reversed courses, such as from 6 to 7, from 7 to 8, from 8 to 9, from 9 to 10, and thence back to 6.

The chain 27 is maitained centrally in the passage-ways 6, 7, 8, 9 and 10 by the arrangement of the sprockets 19, 20, 21, 22, 24 and 25, the chain being positioned some distance above the bottom 4 and passing in a lengthened course throughout the entire heated liquid content 28 of the tank.

The guide rails are positioned slightly above the conveyor chain, as shown in Figure 2, and extend from end to end of each passage-way and are secured in pairs 29 and 30 to the inner side walls of the tank and the partitions 11, 12, 13 and 14, thereof. These guide rails balance and carry the weight of the several cooking utensils 31 in their transit through the several passage-ways, as conveyed by the chain 27 and its rigidly secured and regularly spaced engaging brackets 32.

The feed end of the machine is provided with a conveyor 33 and a chute 34, as a means for the introduction of the utensils containing the food products to be cooked into a selected passage-way determinable by the length of time required for its cooking. When the utensils, or pans, have reached the end of the passage-way 10, they are elevated slightly by the upturned ends of the rails and fed into a short elevator 35, which, in turn, delivers them to a delivery conveyor 36.

The conveyor chain 27 may be driven by a vertical shaft 37, carrying the sprocket-wheel 26 at its lower end, the upper end being provided with a set of miter-gears 38 and a reduction train 39 geared to a small motor 40, the speed of the motor being governable, in this instance, through a rheostat (not shown).

A gas-burner system 41 is shown in the drawings as the heating medium employed to bring to and retain at proper temperature the content of the tank for cooking purposes, though it is apparent that any other heating element would as well serve the purpose.

A gauge 45 may be installed at any convenient point for observation upon the tank for registering the temperature of the liquid content of the tank, thus enabling the one in charge to regulate the cooking temperature. The tank may be further provided with a cover 42 having hinged end-doors 43 and 44, as a heat retaining measure and a convenience in other directions, as well as a drain member 46 for convenience in drawing off the tank content when desired.

Having thus described my invention, I claim, and desire to secure by Letters Patent:

In an apparatus of the character described, in combination, a tank of rectangular shape divided horizontally into upper and lower compartments providing, respectively, an immersion tank and a heating chamber, a heating element in said heating chamber, a plurality of longitudinally and vertically arranged partitions mounted in said immersion tank and extending from end to end thereof and dividing said tank into a plurality of reversely arranged passageways having end-guards, with an end of one passageway leading into that of another, a plurality of sprocket-wheels, forming chain supports, mounted in the ends of each passageway, guide-sprockets mounted in said tank, an endless-chain conveyor mounted in said tank and adapted for support by said sprocket-wheels and guide sprockets, a pair of guide-rails of opposite disposition secured to said partitions slightly above the conveyor and extending throughout said passageways in co-operative association with said conveyor, said guide-rails being adapted to support articles as conveyed through said passage-ways by the conveyor, a feed-chute at the feed end of said tank to deliver articles to the conveyor-chain and an elevator at the opposite end thereof for the delivery of cooked articles as received from the conveyor-chain, a reduction gear-train connected to one of said guide-sprockets, and a motor connected to said train and adapted to drive said conveyor at a predetermined speed.

In testimony whereof I have affixed my signature.

GAETANO CAPPI.